US006584000B1

(12) United States Patent
Lee

(10) Patent No.: US 6,584,000 B1
(45) Date of Patent: Jun. 24, 2003

(54) ELECTRONIC STABILIZER

(76) Inventor: Ching-Chung Lee, No. 55-3, Lane 904, Chung-Shan Rd., Tao-Yuan City (TW)

( * ) Notice: Subject to any disclaimer, the term of this patent is extended or adjusted under 35 U.S.C. 154(b) by 0 days.

(21) Appl. No.: 10/050,294

(22) Filed: Jan. 18, 2002

(51) Int. Cl.[7] .............................................. H02M 7/538

(52) U.S. Cl. ......................................... 363/133; 363/23

(58) Field of Search ......................... 363/22, 23, 56.06, 363/95, 97, 133

(56) References Cited

U.S. PATENT DOCUMENTS 4,353,116 A * 10/1982 Palmers et al. ............. 363/133
6,172,883 B1 * 1/2001 Kates et al. ............. 363/21.18
6,266,254 B1 * 7/2001 Ohtake ........................ 363/22

* cited by examiner

*Primary Examiner*—Adolf Deneke Berhane
*Assistant Examiner*—Gary L. Laxton
(74) *Attorney, Agent, or Firm*—Harrison & Egbert

(57) ABSTRACT

An electronic stabilizer includes an output transformer, a variable frequency/power amplifying loop, a low voltage variable frequency rectifying loop, and two elements of high resistance value. The primary side of the output transformer is connected with the variable frequency/power amplifying loop. The secondary side of the output transformer is connected with the low voltage variable frequency rectifying loop and the voltage boosting and lamp lighting loop. The elements of high resistance value are connected with the nodes of the various frequency/power amplifying loop and the low voltage variable frequency rectifying loop. The electronic stabilizer is adapted to an environment of direct current low voltage or direct current high voltage in which a low voltage bias current is provided to drive a lamp.

4 Claims, 5 Drawing Sheets

ELECTRONIC STABILIZER

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to an electronic device, and more particularly to an electronic stabilizer designed to provide a stable low voltage bias current sufficient to drive a lamp in an environment in which the condition of direct current low voltage or direct current high voltage exits.

BACKGROUND OF THE INVENTION

As shown in FIG. 1, an electronic stabilizer of the prior art comprises a variable frequency loop 11, and an output transformer 301 which has a first coil 311, a second coil 321 and a third coil 331. The variable frequency loop 11 is formed of a bias resistor 271, a first induction-resistant coil 211, a second induction-resistant coil 221, a first transistor 231, a second transistor 241, and a first capacitor 251. A lamp 40 is serially connected with a starting capacitor 41 and is in a parallel connection with the third coil 331 of the output transformer 301. As the current of a power source 10 passes the bias resistor 271, an appropriate low voltage bias current is made available. In view of the fact that the lamp 40 demands a greater amount of low voltage bias current, the bias resistor 271 is often affected by the voltage difference to bring about a high temperature as well as a high consumption of power. For this reason, the electronic stabilizer of the prior art is not suitable for use in a high voltage power circuit.

BRIEF SUMMARY OF THE INVENTION

The primary objective of the present invention is to provide an electronic stabilizer suitable for use in a high voltage power circuit and capable of ensuring the minimum temperature rise of the high voltage power circuit in its entirety.

In keeping with the principle of the present invention, the foregoing objective of the present invention is attained by an electronic stabilizer comprising an output transformer, a variable frequency/power amplifying loop, a low voltage variable frequency loop, and an element of a high resistance value. The primary side of the output transformer is connected with the variable frequency/power amplifying loop. The secondary side of the output transformer is connected with a low voltage variable frequency rectifying loop and a voltage boosting and lamp lighting loop. A first node and a second node of the variable frequency/power amplifying loop and the low voltage variable frequency rectifying loop are respectively connected with an element of a high resistance value. The electronic stabilizer is suitable for use in an environment of direct current low voltage or direct current high voltage. The electronic stabilizer of the present invention is capable of providing a stable low voltage bias current which is sufficient to drive a lamp. In the meantime, the electronic stabilizer of the present invention endures the minimum temperature rise of the entire circuit.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
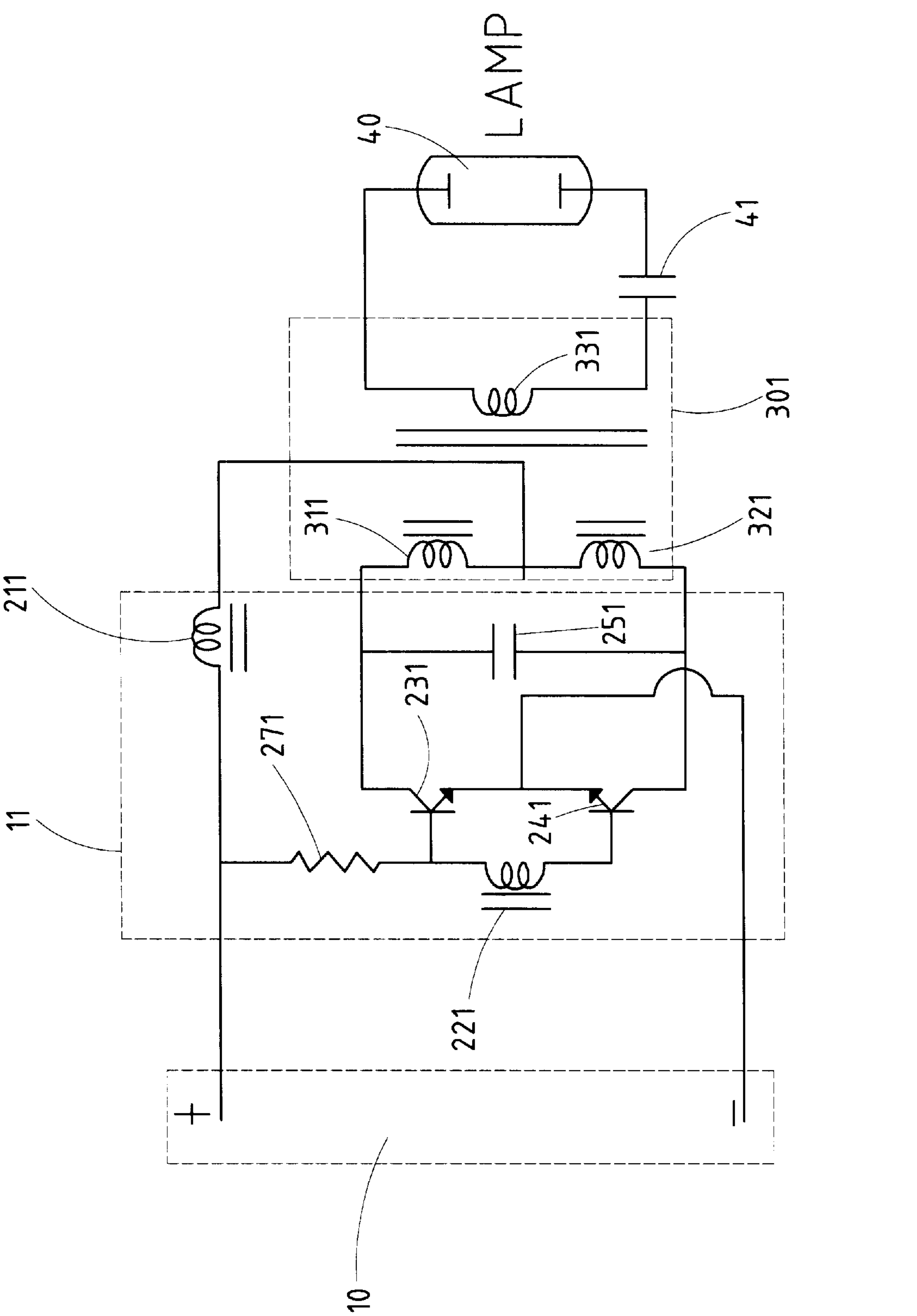
FIG.1 PRIOR ART
FIG. 1 shows a schematic view of a loop of a prior art electronic stabilizer.

As shown in FIGS. 2–5, the loop of the present invention is connected with a power factor modification loop 54 which has the third diode 56, the fourth diode 57 and the fifth diode 58. The loop of the present invention is further connected to a constant current source 55 and an EMI filter/rectifier. 50 which has a bridge rectifier 51.

The electronic stabilizer of the present invention comprises the following components.

An output transformer 30 is formed of a first coil 31 having a primary side, a second coil 32 having a primary side, a third coil 33 having a secondary side, and a low voltage coil 34 having a secondary side.

A variable frequency/power amplifying loop 20 is located at the primary side of the output transformer 30 and is provided with a first induction-resistant coil 21 which is connected with a second induction resistant coil 22, a first transistor 23, a second transistor 24, a first capacitor 25, and a first diode 26.

A low voltage variable frequency rectifying loop 90 is connected to the secondary side low voltage coil 34 of the output transformer 30, a second diode 91, and a second filter capacitor 92.

Two elements 27 and 28 of a high resistance value are respectively connected with a first node 29 of the variable frequency/power amplifying loop 20, and a second node 93 of the low voltage variable frequency rectifying loop 90.

The electronic stabilizer of the present invention is adapted to an environment of direct current low voltage or direct current high voltage such that the present invention provides stably a low voltage bias current sufficient to drive a lamp 40, and that the present invention ensures the minimum temperature rise of the entire circuit.

The two elements 27 and 28 of the high resistance value resistors.

The resistors 27 and 28 and the low voltage variable frequency rectifying loop 90 are preferably provided therebetween with a constant current source 55.

Figure 2:
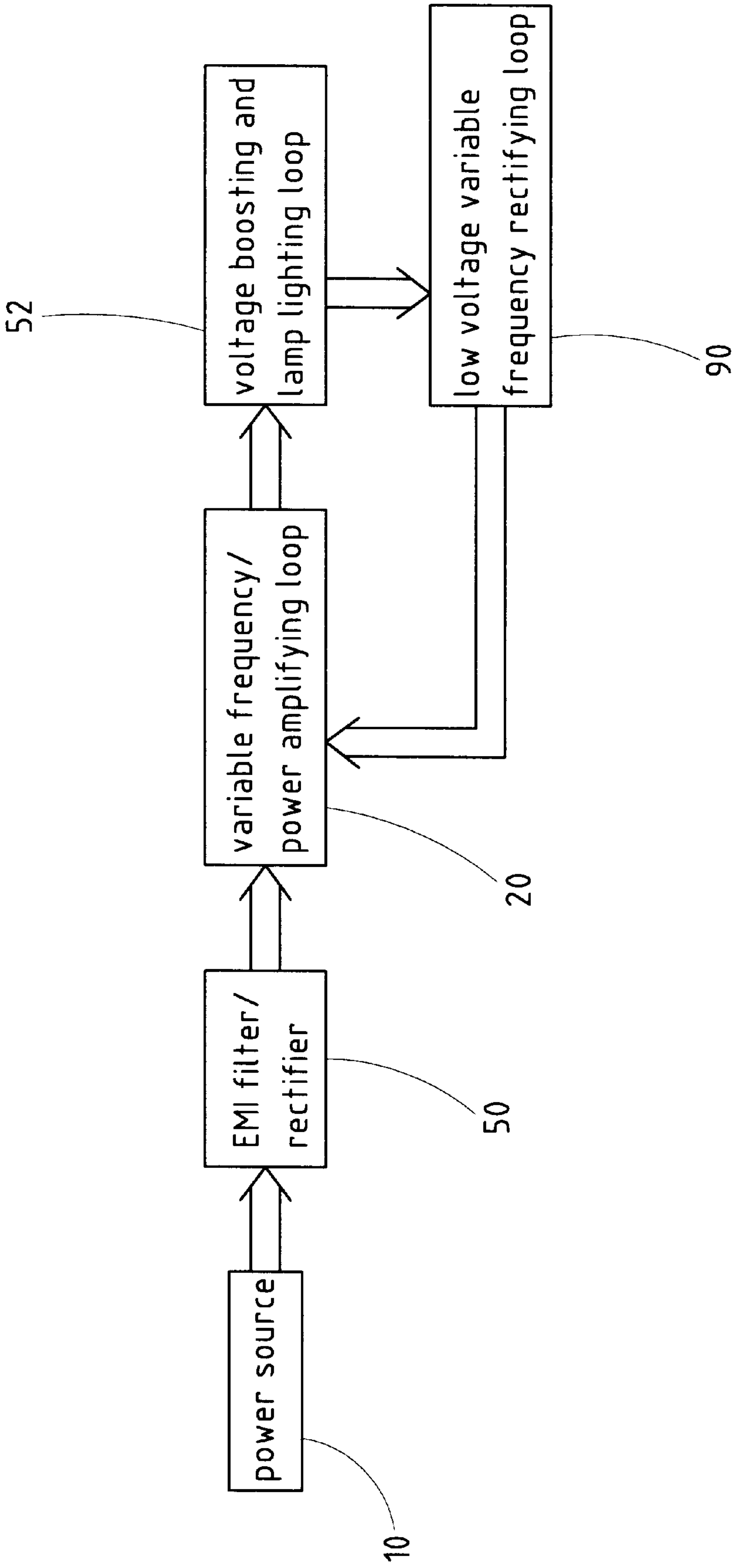
FIG. 2 is a diagrammatic illustration showing a block diagram of the present invention.
Figure 3:
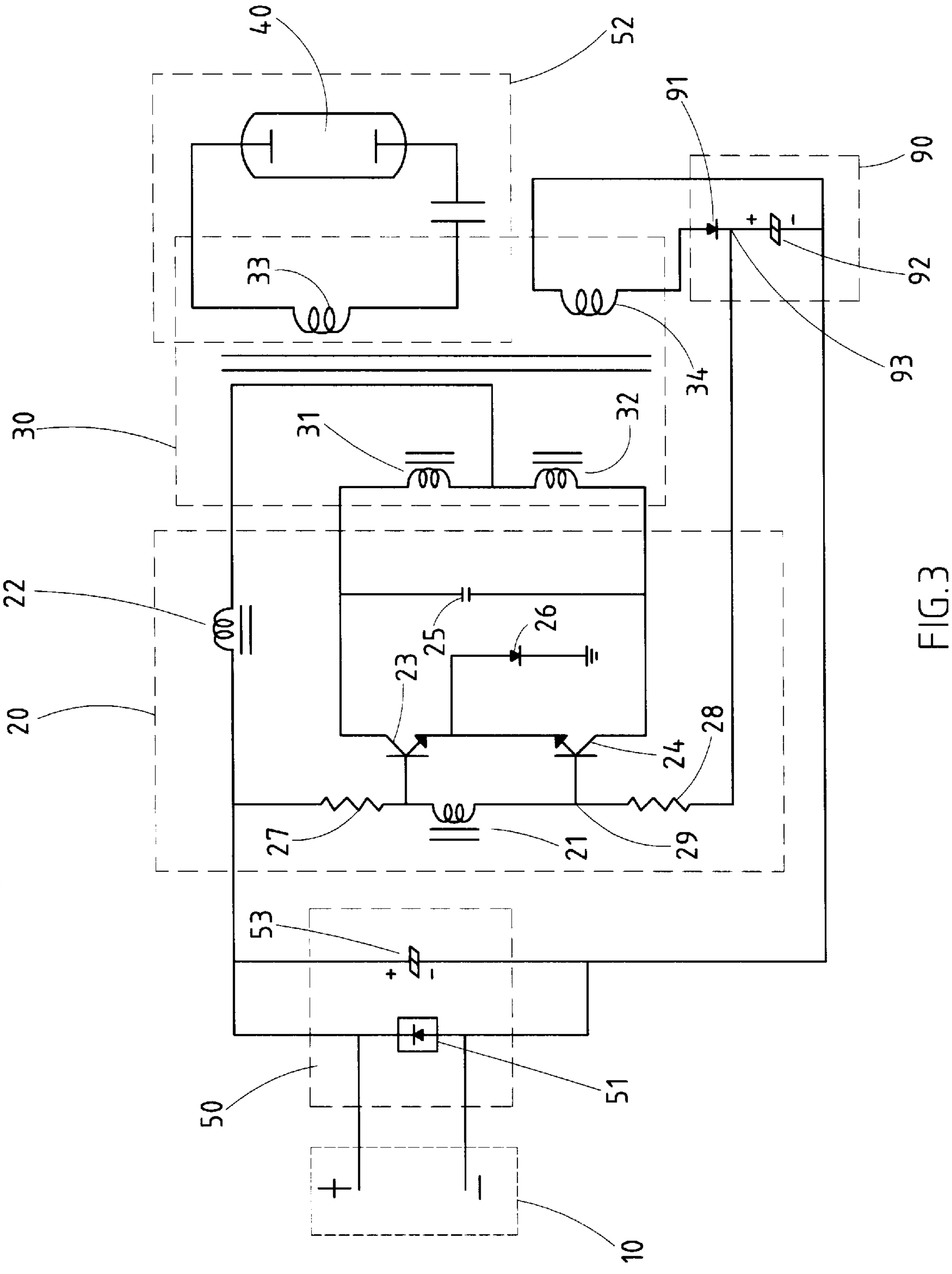
FIG. 3 shows a schematic view of a loop of the present invention.
Figure 4:
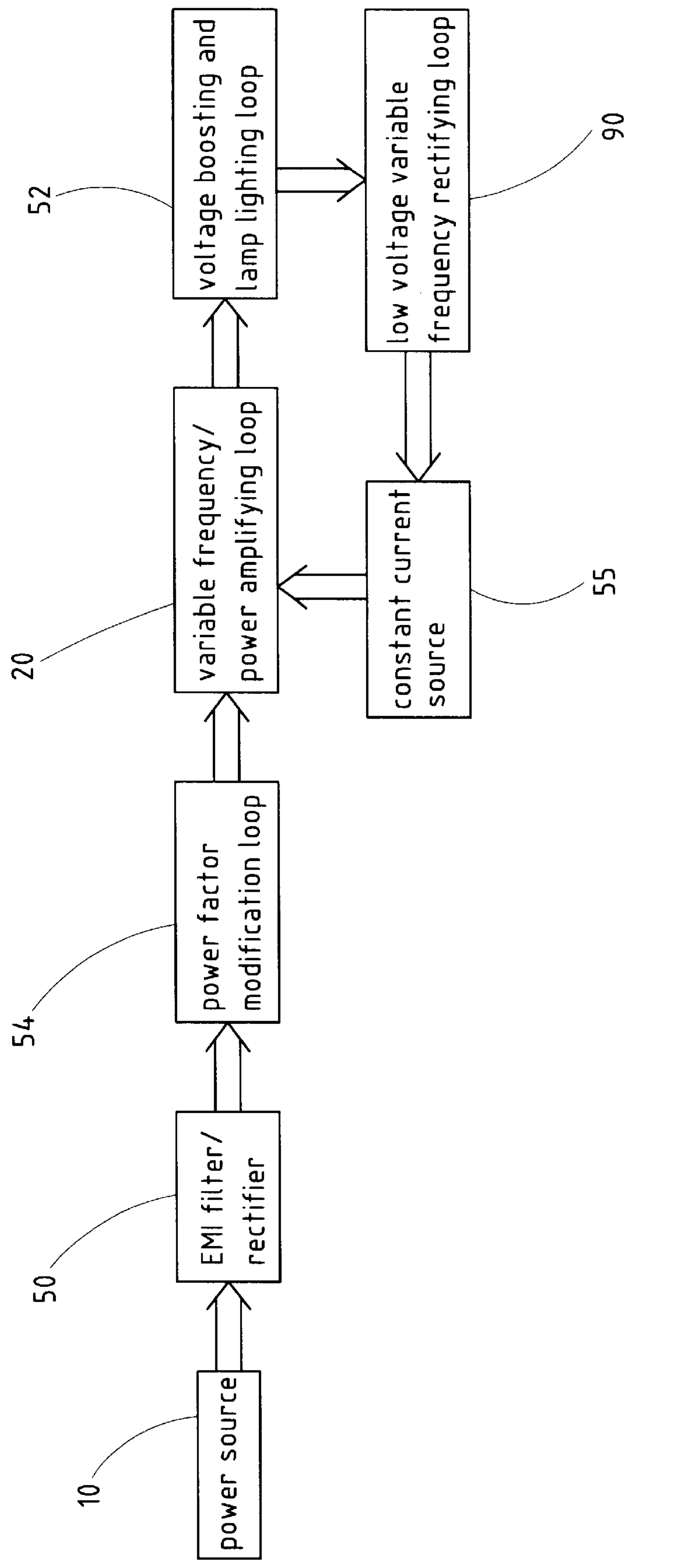
FIG. 4 is a diagrammatic illustration showing a block diagram of the embodiment of the present invention.
Figure 5:
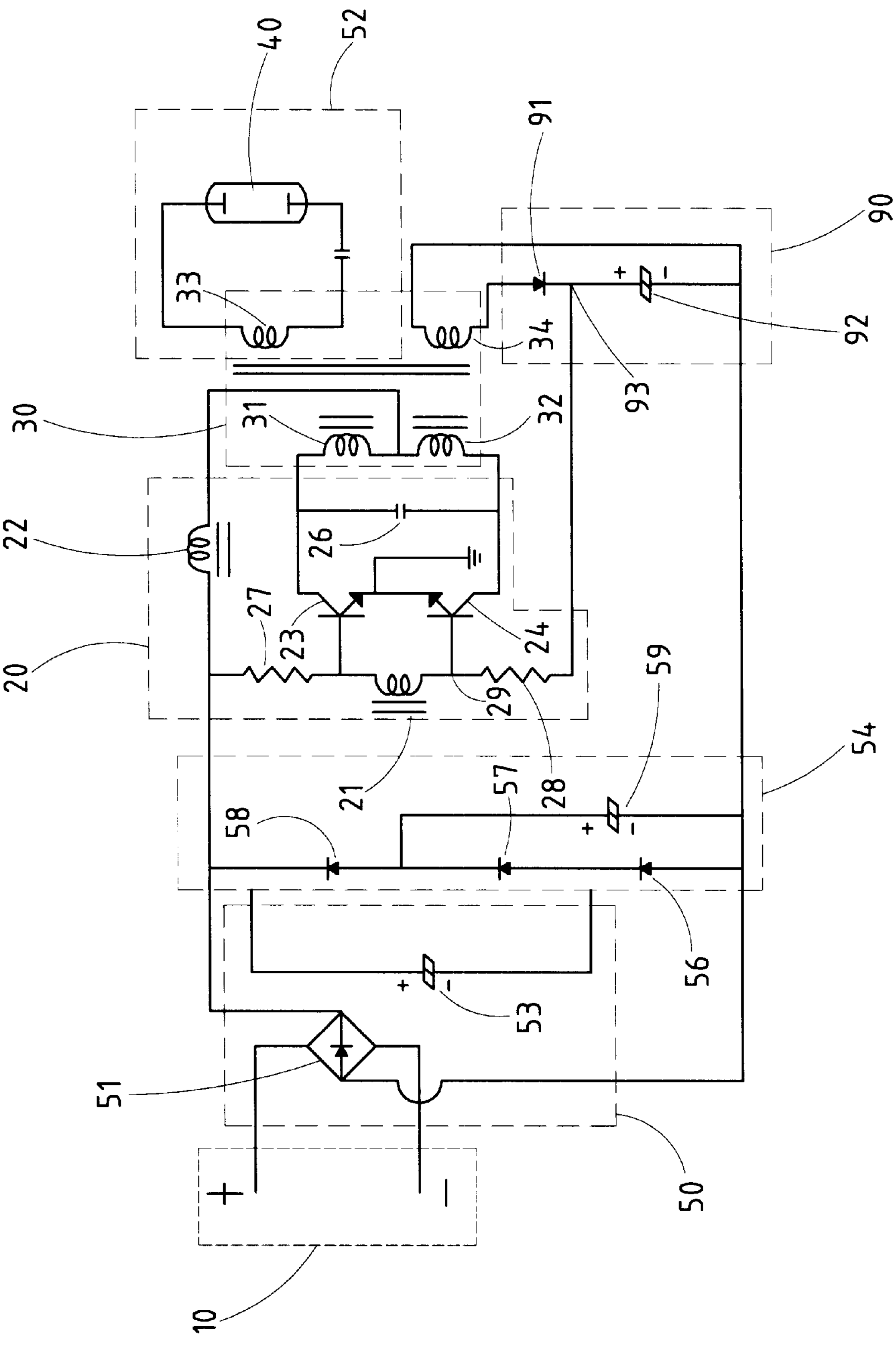
FIG. 5 shows a schematic view of a loop of the embodiment of the present invention.

As shown in FIGS. 2 and 3, the current of a power source 10 enters the bridge rectifier 51 via the EMI filter/rectifier 50 such that it is rectified by the first filter capacitor 53 before being sent to the variable frequency/power amplifying loop 20. In light of the actions of the two resistors 27 and 28, the variable frequency/power amplifying loop 20 provides via the output transformer 30 an excited bias current of low voltage and low current to start the lamp 40. In the meantime, the low voltage coil 34 generates an induction current, which is rectified by the second diode 91, and the second filter capacitor 92 to become a bias current of low voltage and having a sufficient power to start the lamp 40. The resistors 27 and 28 of the variable frequency/power amplifying loop 20 are prevented from generating the high temperature and consuming a large amount of power because of the voltage difference, thereby resulting in the effect of the minimum temperature rise. As shown in FIGS. 4 and 5, the loop of the present invention is provided with the power factor modification loop 54 and the constant current source 55. The current of the power source 10 is first rectified by the EMI filter/rectifier 51 and is then adjusted in input power factor by the power factor modification loop 54. The current is introduced into the variable frequency/power amplifying loop 20 such that the current becomes an excited bias current of low voltage and low current, thanks to the actions of the resistors 27, 28, and the output transformer 30. In the meantime, the low voltage coil 34 generates an induction current, which enters the constant current source 55 to generate once again a bias current of low voltage, which has a sufficient power to drive the lamp 40. By means of the constant current source 55, the present invention is better adapted to the change in power source, voltage, or load. The constant current source 55 may be also a constant voltage source.

The present invention described above is to be regarded in all respects as being illustrative and nonrestrictive. Accordingly, the present invention may be embodied in other specific forms without deviating from the spirit thereof. The present invention is therefore to be limited only by the scope of the following claims.

I claim:

1. An electronic stabilizer comprising:

an output transformer comprised of a first coil having a primary side, a second coil having a primary side, a third coil having a secondary side, and a low voltage coil having a secondary side;

a variable frequency/power amplifying loop disposed at the primary side of said output transformer and comprised of a first induction-resistant coil which is connected to a second induction-resistant coil, a first transistor, a second transistor, a first capacitor, and a first diode;

a low voltage variable frequency rectifying loop connected with the secondary side low voltage coil of said output transformer, a second diode, and a second filter capacitor; and two elements of a high resistance value and connected respectively with a first node of said variable frequency/power amplifying loop, and a second node of said low voltage variable frequency rectifying loop.

2. The electronic stabilizer as defined in claim 1, wherein said two elements of the high resistance value are resistors.

3. The electronic stabilizer as defined in claim 1, wherein said elements of the high resistance value and said low voltage variable frequency rectifying loop are preferably provided therebetween with a constant current source.

4. The electronic stabilizer as defined in claim 1, wherein said elements of the high resistance value and said low voltage variable frequency rectifying loop are preferably provided therebetween with a constant voltage source.

* * * * *